(12) United States Patent
Mani (10) Patent No.: US 6,482,305 B1
(45) Date of Patent: Nov. 19, 2002

(54) ELECTRODIALYSIS WATER SPLITTING PROCESS

(75) Inventor: Krishnamurthy N. Mani, Basking Ridge, NJ (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 09/562,233

(22) Filed: Apr. 28, 2000

Related U.S. Application Data

(60) Provisional application No. 60/151,967, filed on Sep. 1, 1999.

(51) Int. Cl.[7] .............................................. B01D 61/44

(52) U.S. Cl. ...................... 204/534; 204/537; 204/538

(58) Field of Search ................................ 204/534, 537, 204/538

(56) References Cited

U.S. PATENT DOCUMENTS 5,200,046 A * 4/1993 Chlanda et al.

* cited by examiner

Primary Examiner—Arun S. Phasge
(74) Attorney, Agent, or Firm—Sterne, Kessler, Goldstein & Fox P.L.L.C.

(57) ABSTRACT

An electrodialysis water splitting processes incorporates a chromatographic separation step using an amphoteric ion exchange resin to remove contamination salts from a salt solution feedstream and a base product solution. When the chromatographic column is subsequently eluted with water an effective separation of the components is achieved. The separated pure salt stream is forwarded to an electrodialysis water splitter cell for conversion to acid and base. The base product solution (sodium hydroxide, potassium hydroxide) may be similarly purified by passing through a second chromatographic column also containing an amphoteric resin to separate the base from the salt (recovered salt). The process is also applicable in a chlor-alkali process for acidifying the brine feed to the electrolysis cell and for producing high purity caustic from salt.

16 Claims, 5 Drawing Sheets

ELECTRODIALYSIS WATER SPLITTING PROCESS

This is a formal Patent Application to replace Provisional Application Serial No. 60/151,967, filed Sep. 1, 1999.

This invention relates to processes arising out of the use of a chromatographic separation step in combination with electrodialysis water splitting that improve process reliability and efficiency, and enable production of a high quality base product.

BACKGROUND OF THE INVENTION

In an electrodialysis water splitting processes for the production of an acid and base from salt, the feed salt may be purified to remove certain contaminating anions in order to ensure reliable long term operation. Similarly, the product base also has a certain amount of contaminating anions that need to be removed and then, preferably, the solution containing contaminating anions is recycled.

A bipolar membrane based water splitting process is a low cost, low energy route to the production of acids and bases from their salts. A detailed description of the technology, its applications, and limitations can be found in an article by K. N. Mani ("*Electrodialysis water splitting Technology*", J. Membrane Sci., 58, (1991) pp. 117–138). With this technology, two or three compartment cells may be used to convert soluble salts such as sodium chloride (NaCl), potassium chloride (KCl), sodium sulfate ($Na_2SO_4$) to their corresponding base (sodium hydroxide NaOH; potassium hydroxide, KOH) and acid (hydrochloric acid, HCl; sulfuric acid, $H_2SO_4$).

One limitation for the bipolar membrane technology is that there is a certain amount of salt contaminant present in the end product acid and the base. The problem arises out of the non-ideal permselectivity of the membranes as well as possible internal leakage. The contamination of the acid with salt is usually less problematic; since in many processes the acid is internally consumed (e.g., U.S. Pat. No. 4,391,680—Brine acidification for chlor-alkali plants, U.S. Pat. No. 4,504,373—Sodium sulfate conversion in rayon plants, Pending U.S. application Ser. No. 09/223,054—Production of amino acid hydrochloride and caustic via electrodialysis water splitting). However, salt contamination of the caustic co-product (e.g. NaOH, KOH, LiOH) can present a serious problem in many instances, since certain end uses demand high purity. When the caustic is sold commercially, it has to meet the industry specifications on the salt content. One example of a high purity base product is potassium hydroxide, which is sold at 45 wt % strength, typically has only ~50 ppm of KCl present. Contamination of the product with salt also, in effect, represents a loss of raw material.

Known chromatographic methods separate components in a given stream and are practiced on a large scale for certain applications such as dextrose/fructose separation. The use of ion exchange resins to purify solutions using ion retardation, ion exclusion techniques is known. (See Diaion® Manual of Ion exchange Resins/Adsorbents; Vol. I, II published by Mitsubishi Chemical Corporation). U.S. Pat. No. 4,154,801 outlines the use of composite ion exchange resin bodies to purify alkali metal hydroxide and carbonate solutions. However, these unit operations have not been used to improve the operation or performance of electrodialysis water splitting processes.

U.S. Pat. No. 5,200,046 describes an apparatus and process for producing acid and base of improved purity. The apparatus uses a multi-compartment cell containing two bipolar membranes per cell. A liquid usually comprising water is circulated in the compartment between the two bipolar membranes, so as to trap the transported salt contaminant. While somewhat effective, the process is complex, and has a relatively high capital and operating (i.e. energy) costs.

Additionally, in certain salt conversion applications, there is need for a more thorough pre-treatment of the salt feed solution. For example in the brine acidification application disclosed in U.S. Pat. No. 4,391,680, the feed salt (NaCl) is acidified in a two compartment cation cell employing bipolar and cation membranes so as to obtain an NaCl/HCl solution which is subsequently processed in a chlor-alkali cell to generate chlorine and caustic soda. Unfortunately, integration of the two compartment cation cell with the chlor-alkali cell is made difficult or impossible because of the presence of chlorate ($NaClO_3$), an oxidizing species, in the recycle brine solution. Such oxidizing species have an adverse effect on the hydrocarbon based membranes that are used in the two compartment cation cells.

A need exists for an improved process for acidifying the brine feed to the electrolysis based chlor-alkali process.

There is also a need for a process for producing high purity base product from a salt raw material, as well as a method for recovering and reusing the salt contaminant.

SUMMARY OF THE INVENTION

Electrodialysis water splitting processes have been devised by an incorporation of a chromatographic separation step to substantially completely remove the contaminating salt from the feed salt solution and/or the product base solution. The chromatographic separation step uses an amphoteric ion exchange resin. The resin has a slightly different affinity toward the contaminating salt as compared to the affinity for the bulk component (pure salt) in the stream. When the column is subsequently eluted with water, an effective separation of the components is achieved. The separated pure salt stream is forwarded to the electrodialysis water splitter cell for conversion to acid and base. The base product solution (sodium hydroxide, potassium hydroxide) from the water splitter cell is similarly purified by passing through a second chromatographic column also containing an amphoteric resin, so as to obtain an effective separation of the base from the salt (recovered salt). The purified base solution is then concentrated, as needed, for sale. The recovered salt solution is returned to the electrodialysis water splitter cell for conversion into acid and base.

The inventive process is applicable in the chlor-alkali process for acidifying the brine feed to the electrolysis cell. The feed brine is purified by passing it through a chromatographic column containing an amphoteric ion exchange resin, so as to separate out the contaminating sodium chlorate salt ($NaClO_3$). The purified brine is then acidified by processing it through either a two compartment water splitting cell comprising bipolar and cation membranes or a three compartment water splitter comprising bipolar, cation and anion exchange membranes. An equivalent amount of NaOH is produced in the cell as co-product. The chlorate rich effluent from the chromatographic column is combined with the acidified brine from the water splitter and forwarded to the electrolysis cell.

The inventive process is of particular use in producing a high purity caustic from salt. In the process, a salt such as potassium chloride is purified as needed and converted in a three compartment water splitter comprising bipolar, cation and anion exchange membranes using a direct current driving force. The output from the acid loop might comprise dilute HCl or an acidified compound such as lysine hydrochloride (lysine (HCl), obtained by reacting lysine with the HCl that is produced; or with glutamic acid hydrochloride (glutamic (HCl) that is obtained by reacting glutamic acid with the HCl that is produced), as described in my earlier U.S. application Ser. No. 09/223,054, now U.S. Pat. No. 6,110,342.

The output from the base loop is usually about 10–18 wt % KOH, contaminated with 500–8000 ppm KCl. The base solution is processed through a chromatographic column containing an amphoteric ion exchange resin. The resin has a high affinity for the salt, so that when the column is initially eluted with water a pure concentrated product is recovered first, that is then sent to a downstream concentration step. A further elution with water results in the recovery of a stream that is rich in salt. This stream is returned to the water splitter for conversion to acid and base.

The combination of chromatography and water splitting results in an improved brine acidification process. The combination also results in a novel route to the production of a high quality base product, while also permitting a recovery and reprocessing of the salt contaminant.

BRIEF DESCRIPTION OF DRAWINGS

The invention will be best understood from the following specification taken with the attached drawings, in which:

FIGS. 2a–2c are, respectively, a schematic showing the electrodialysis cells which are useful for the invention and which have (a) two compartment cells forming base and salt/acid compartments; (b) a three compartment cell forming salt/acid base, and acid compartments; and (c) a three compartment cell having salt, base, and acid compartments;

FIG. 3 is a graph showing test results of a separation of a chloride contaminant from a feed stream;

FIG. 4 shows the integration of the brine acidification process and the chlor-alkali process.

DETAILED DESCRIPTION OF THE PROCESS

Figure 1:
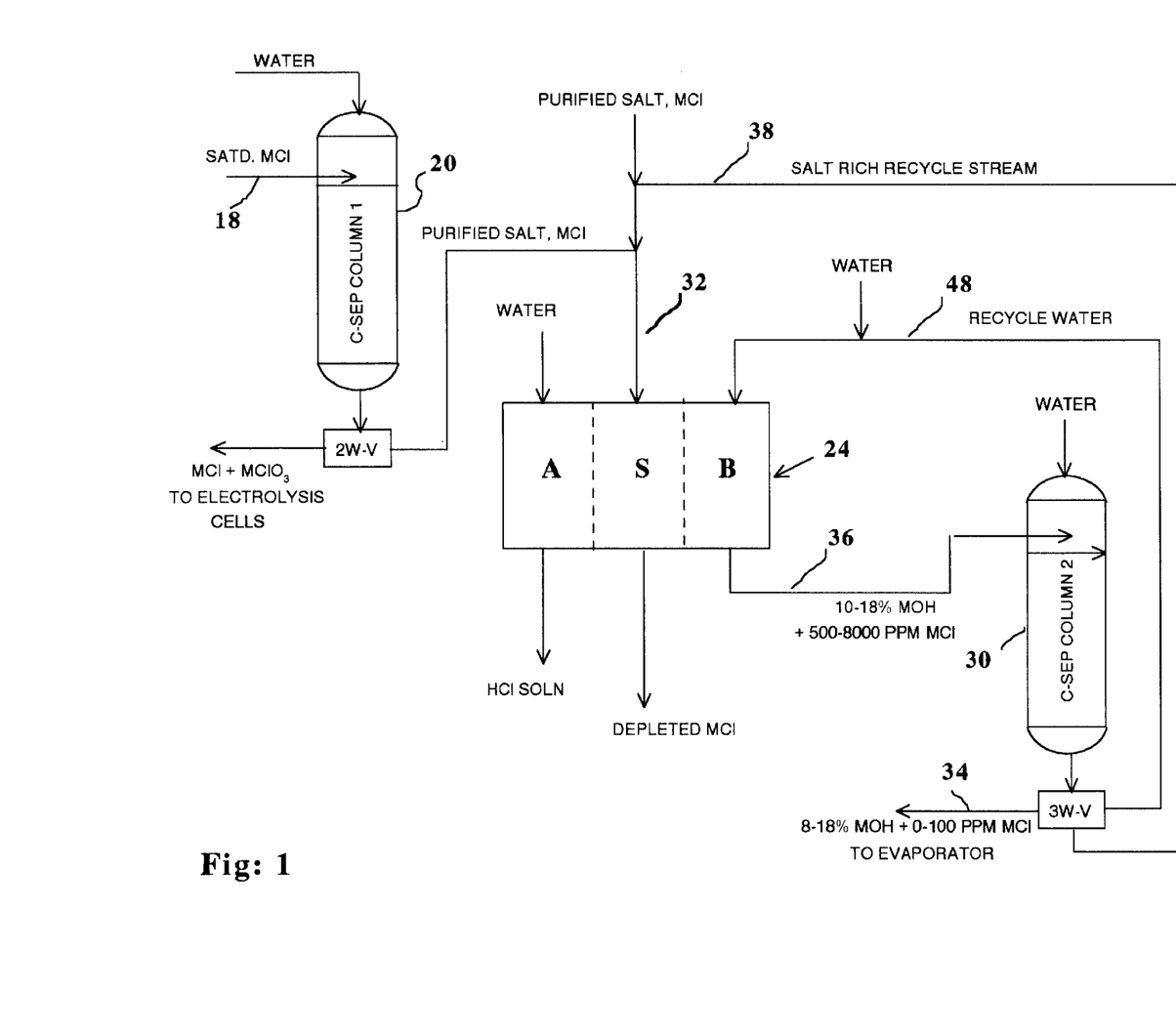
FIG. 1 is a schematic drawing of the basic invention using a three compartment electrodialysis cell.

The inventive process is schematically shown in FIG. 1. A saturated salt solution (e.g., sodium chloride, NaCl or potassium chloride, KCl) may contain an undesirable contaminant such as sodium chlorate ($NaClO_3$) or potassium chlorate ($KClO_3$). The solution is processed in a chromatographic separation (C-SEP Column 1) 20 to recover a first stream that is substantially free of the chlorate, and a second stream that contains the chlorate as well as a significant amount of the chloride.

The C-SEP column 20 is packed with an amphoteric ion exchange resin. Suitable resins may be either AMP 01 from Mitsubishi Chemical Corporation or 11A8 from Dow Chemical. In order to effect the separation, a certain volume of feed is charged to the column, followed by a certain volume of water for elution. The resin has a selectivity which is higher for chlorate than it is for chloride, so that the chloride is eluted first, followed by an elution of the chlorate rich solution. By carefully monitoring the effluent property, e.g. via a refractive index, it possible to obtain a quantity of a solution containing chloride that is substantially free of the chlorate. (T. Matsushita, J. Ion Exchange 7(3), 1996, pp. 36–43).

The chloride solution is optionally combined with a purified brine solution from a different source (e.g. by dissolving purchased salt in water to obtain a saturated solution that is subsequently purified by methods known in the art). Then, the saturated solution is fed to the salt loop of an electrodialysis water splitter.

While, FIG. 1 shows a three compartment cell 24, either a two or three compartment cell may be used. In the water splitter, the salt is converted to acid and base under a direct current driving force. The base product from the cell (out of the base compartment B) is usually about 10–18 wt % strength. The product acid (HCl, out of the acid compartment A) usually has about a 3–8 wt % concentration. The output from the salt compartment (S) is depleted in its salt content. Depending on the operating conditions and the membranes deployed, the depleted salt solution may also contain a certain amount of free HCl.

Disposition of the depleted salt solution and the acid product depends on the specific application. When used in a chlor-alkali plant, for example, the salt stream may be forwarded to the electrolysis cells for the production of chlorine and caustic, while the acid product can be used in a number of places within a manufacturing plant complex.

The base product from the water splitter contains a certain amount of salt contaminant, e.g., about 500–8000 ppm in the form of the chloride salt. The presence of salt in the base (and acid) occurs because the ion exchange membranes used in the water splitting process are not 100% permselective. Consequently there is a certain amount of salt ion transport across the membranes from the adjoining compartments (see the above cited Mani reference for more details).

In the improved process of this invention, the base product solution from the water splitter is purified by passing it through a column (C-SEP Column 2) 30 containing an amphoteric ion exchange resin. The resin has a selectivity which is higher for the salt when compared with the selectivity for the base product. Consequently, when the column is subsequently eluted with water, the base product solution is recovered first and in a highly purified form, while the salt-rich solution elutes later. The salt rich solution is returned to the salt loop 32 of the water splitter for conversion back to acid and base. The purified base product is further concentrated at 34 as desired and sold.

If desired, three different fractions may be collected from the column outlet as shown in the figure. The first fraction comprises the purified base at 34, the second a salt rich stream at 38, while the third is a weak stream 40 containing only small amounts of salt and base. In this case, the salt rich stream at 38 (the second fraction) may be forwarded to the salt loop of the water splitter for conversion to acid and base, while the third fraction, comprising mostly water and small amounts of base and salt, is forwarded to the base loop in order to provide dilution water. In this manner, the dilution of the caustic product is minimized, while salt recovery is maximized.

FIG. 2 shows the cell arrangements used to produce acid and base from salt. In each of the three FIGS. 2(a)–2(c), the input feedstream is shown as MCl. FIG. 2(a) shows a two compartment cell containing bipolar (−+) and cation (+) exchange membranes 44, 46. Suitable membranes are available from Tokuyama Corporation, Asahi Glass Co. and Aqualytics, Inc. In the cell, the membranes are used to contain the base (B) and salt/acid (S/A) compartments as shown.

The compartments are fashioned out of thin (~1 mm thick) polymeric gasket material. Suitable cutouts within the gaskets are compartments in which the solution flow occurs. The compartments are preferably packed with a suitable non-woven netting material that separates and mechanically supports the adjacent membranes, while allowing a solution flow. Entry and exit of process solutions from the individual gasket/compartment is achieved via "ports" that are fashioned within each gasket/compartment.

The assembly comprising a base compartment, bipolar membrane, a salt/acid compartment and a cation membrane is termed a "cell pair" or simply a "cell". As many as about 100–200 cells may be assembled between a single set of anode (+) and a cathode (−) electrodes 48, 50. The entire assembly, comprising the electrodes, gaskets and membranes, is held together by a set of end plates/backup plates (not shown) and a suitable clamping mechanism. In a properly constructed cell assembly, there should be little or no fluid leakage between the various compartments.

In the two compartment cell 42 shown in FIG. 2(*a*), the feed salt is acidified in the salt/acid loop, while an equivalent amount of base is generated in the base loop responsive to the application of a direct current driving force. The feed salt solution is admitted to the S/A compartment between a cation membrane 46 and the cation selective side of the bipolar membrane 44. A liquid comprising water is admitted to the compartment B bounded by a cation membrane 52 and the anion selective side of the bipolar membrane 44. Under the direct current driving force, the salt cations ($M^+$) move from the salt/acid compartment S/A, across the cation selective membrane (+) at 44 and into the base compartment B.

Simultaneously, hydrogen ions ($H^+$) are generated on the cation selective side of the bipolar membrane 44 from the dissociation of water. This process results in the acidification of the salt feed. Simultaneously, hydroxyl ions ($OH^-$) ions are generated on the anion selective side (−) of the bipolar membrane 44 and are injected into the base compartment B. The net result is an acidification of the feed salt and the simultaneous production of an equivalent amount of base product:

Salt compartment: $MCl(excess)+H^+-M^+=MCl+HCl$

Base compartment: $M^++OH^-=MOH$.

The acidified salt and base product solutions are withdrawn from their respective compartments.

Two issues are worth noting. The first issue involves the competitive transport of $H^+$ and $M^+$ ions across the cation selective membrane. The mobility of hydrogen ions is significantly more than the mobility of the salt cation. This, in turn, reduces the overall process efficiency, since only the transport of the salt cation results in the production of the base product. For this reason, the process works best when there is a large excess of salt cations.

The second issue concerns the transport of salt anions ($Cl^-$) across the bipolar membrane 44 and into the base compartment B. The bipolar membrane is not 100% permselective, so that a small percentage of the undesirable ion, namely the salt anion, transports in the direction of the current to the base compartment. This leads to the contamination of the base product with salt.

The problem of salt contamination of the base product is much more severe in the water splitting process than in the membrane electrolysis process. This is because, in the electrolysis process, the production of acid and base is effected through the use of electrodes 48, 50, which are impervious to the transport of salt ions. In effect, the electrodes bounding the electrolysis cell are 100% permselective.

FIG. 2(*b*) shows the order of the membrane assembly for a three compartment cell 56. The cell has a bipolar membrane 58, cation membrane 62(+), and an anion membrane 60(−). The compartments bounding the membranes are once again formed of gaskets, resulting in an acid (A) compartment between the anion membrane 60 and the anion selective side of the bipolar membrane, a base compartment (B) between the cation selective side of the bipolar membrane 58 and the adjacent cation membrane 62, and a salt compartment (S/A) between the cation exchange membranes 62 and a second anion membrane 64. The assembly comprising three membranes and the three compartments is termed a "cell". As many as about 100–200 cells may be assembled between an anode 48 and a cathode 50, so as to form a compact water splitting cell stack.

In the process, a purified salt solution is fed to the salt compartment S/A, while a liquid comprising water is admitted to the acid A and base B compartments. Under a direct current driving force, the bipolar membrane generates $H^+$ and $OH^-$ ions in the acid and base compartments respectively. Simultaneously, salt cations $M^+$ and anions $X^-$ from the dissociation of salt MX are transported across the cation and anion 60/64 membranes respectively. The net result is the production of acid HX and base MOH from salt. The acid, base, and the depleted salt products are withdrawn from their respective compartments.

Since the ion exchange membranes are not 100% permselective, a certain amount of undesirable ionic transport occurs within the cell. Some of this transport is shown in the form of dashed lines in the figure. The transport of salt anion $X^-$ from the acid loop across the bipolar membrane 58 leads to the formation of salt in the base product. Other sources of inefficiency arise from the transport of co-ions, (e.g., the transport of $H^+$ ions) across the anion membrane 60 and the $OH^-$ ions across the cation membrane. Typically, the movement of $H^+$ ions across the anion membrane is greater than the movement of the $OH^-$ ions across the cation membrane 62, so that during the process the salt loop S/A tends to become acidic.

FIG. 2(*c*) shows a three compartment cell 70, wherein a suitable neutralizing compound is admitted to the acid loop. An amino acid, represented as $RNH_2$, is an example of a neutralizing (or buffering) compound. The acid generated within the acid loop would react with the amino acid, forming a salt:

$HX+RNH_2=RNH_2.HX$

In certain instances, the amino acid can react with two moles of hydrochloric acid to form the di-hydrochloride: $RNH_2.(HCl)_2$.

Such a buffering effect would reduce undesirable ion transport and improve the overall process efficiency. The base product would nevertheless contain a certain amount of salt, arising from the transport of $X^-$ ions across the bipolar membrane 72.

Three compartment cells of the type shown in FIGS. 2(*b*) and 2(*c*) were used to produce potassium hydroxide ("KOH") from potassium chloride. A purified potassium chloride salt solution was used as the feedstream and a 15–18 wt % KOH solution generated. Product KOH contained ~320 ppm chloride.

Purification of the product KOH was studied through the use of pulse tests on various resins and at different operating conditions. In a first trial, a 2.2 cm. diameter column was packed with ~100 ml of AMP01 ion exchange resin and rinsed thoroughly to remove the entrained impurities. Then, 50 ml. of the ~15 wt % KOH solution from the water splitter cell was admitted to the top of the column and allowed to be adsorbed. The column was then eluted with DI water and the effluent fractions collected at various time intervals and analyzed for their potassium and chloride content.

In a second trial, the 15 wt % KOH solution was fortified with additional salt (KCl) resulting in a chloride concentration of ~3500 ppm. Next, 50 ml of this solution was once again processed in the same ion exchange column, eluted with water and the fractions collected and analyzed as before.

FIG. 3 shows the results from the two tests. "Pure" KOH containing essentially no chloride contaminant is eluted first. After the first 52 ml. of solution, containing ~98% of the KOH in the feed sample, has been withdrawn, the chloride rich solution is eluted as a strong, sharp peak. Consequently, it is possible to separate out substantially all of the chloride contaminant from the feed KOH solution. Furthermore, the peak separation between the components is good enough to permit the recovery of the purified KOH with minimal dilution.

The separation of the chlorate from the chloride rich solution proceeds in a similar but slightly less effective manner, using an amphoteric resin.

It should be pointed out that the effectiveness of the chromatographic separation technique is specific to the solution mixture and the resin that is used. For example, the amphoteric resins AMP01 and 11A8 for example were found to be highly effective in separating the chloride from the alkali metal hydroxide (NaOH, KOH). Separation of other anions, such as sulfate, lactate from the alkali hydroxide using these resins was either extremely poor or ineffective.

Specific Embodiments of the Process

FIG. 4 shows the integration of the brine acidification process with the chlor-alkali process by using the process of this invention. The process of FIG. 4 starts with NaCl at input 81. More particularly, the chlor-alkali cell 80 uses a purified, acidified brine at input 82 (i.e., NaCl, along with some $NaClO_3$, $Na_2SO_4$ and HCl) and generates sodium hydroxide (NaOH), chlorine gas ($Cl_2$) and hydrogen ($H_2$). The depleted brine solution from the cell 80 appears at output 84 and contains a number of undesirable components such as oxygen, chlorine, hypochlorous acid, hypochloric acid and chlorate. Substantially all of these contaminants are removed from the depleted brine by using a combination of acidification (with additional HCl) and vacuum stripping operations at 86. Sodium chlorate ($NaClO_3$) is one component which is deleterious to the water splitter operation and which is not removed to a significant extent during these purification steps.

The depleted brine is then re-saturated at 86 with solid salt(NaCl) and purified at 88 to remove impurities such as calcium and magnesium. The procedure for this is well known, and includes a pH adjustment, filtration and chelating resin ion exchanger treatment. The purified salt solution comprises primarily sodium chloride, but also certain amounts of sodium chlorate and sodium sulfate. This solution is suitable for feeding directly to the chlor-alkali cell 90.

The inventive process uses a water splitting cell 92 to directly acidify the brine feed or optionally to generate a certain amount of hydrochloric acid solution. With either option an equivalent amount of sodium hydroxide is also generated.

In the process, the brine solution is passed through a column 92 containing an amphoteric ion exchange resin. The resin has a selectivity for chlorate which is higher than its selectivity for chloride, so that an effective removal of chlorate from a portion of the chloride solution is achieved. The chloride solution, substantially free of the chlorate is then processed in the water splitter 92, while the chlorate rich brine solution is directed to the chlor-alkali cell as shown.

A three compartment water splitter 56 as shown in FIG. 2(b) is particularly well suited to the brine acidification application, since it provides an acidified brine stream as well a concentrated acid (HCl) solution, along with caustic product. The acid product can be used in a number of places within the chlor-alkali plant, namely, brine acidification, chlorine stripping and for regenerating the chelating resin column. A two compartment cell 56 shown in FIG. 2(a) can be used in place of the three compartment cell 56 pf FIG. 2(b), but this would generate only the acidified brine stream, along with an equivalent amount of the caustic product.

The caustic product, which is typically contaminated with a certain amount of chloride may then be processed in an optional second chromatographic column (C-SEP 2) (not shown) so as to recover a purified caustic product and a salt rich stream that can be recycled as shown in FIG. 1.

The treatment of the purified brine in the amphoteric resin column 30 is an important pre-requisite to a reliable operation of the water splitting cell 24. This is because any chlorate present in the feed to the water splitter cell will react with the hydrogen ions generated therein, producing strongly oxidizing compounds such as chlorine and chlorine dioxide ($ClO_2$). These oxidizing species are detrimental to the chemical stability of the hydrocarbon based membranes that are used in the water splitter cell 24. The use of a step including this chromatographic separation column 30 permits an isolation of a chloride stream that can be reliably processed in the water splitter 24. A chlorate-rich stream is produced that can be forwarded directly to the chlor-alkali cell. An improved brine acidification process is thereby realized.

Figure 5:
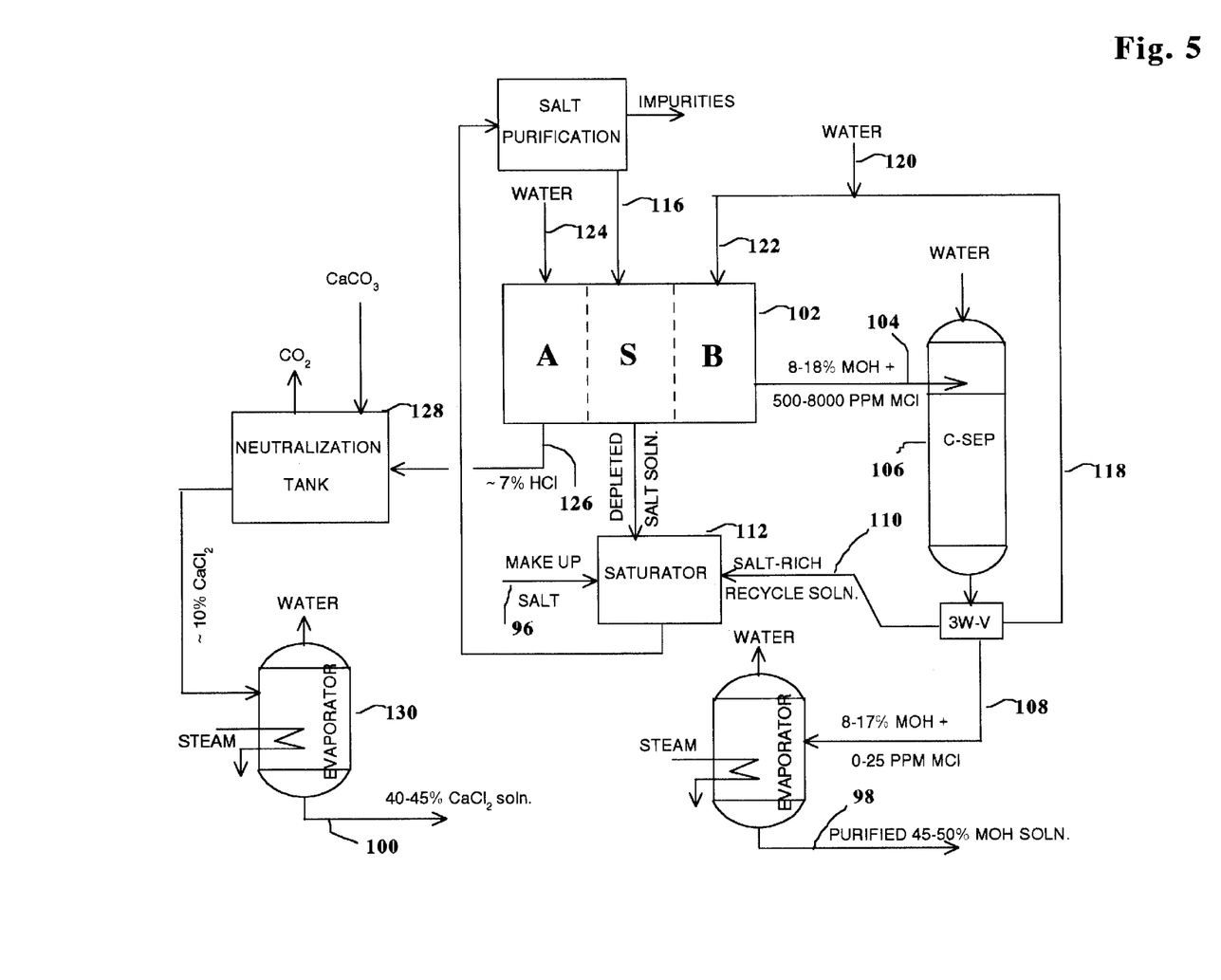
FIG. 5 is a schematic diagram which shows an application of the inventive process to purify a feed stream.

FIG. 5 shows an application of the inventive process which begins with the production of a purified base product (MOH) at 48 and a high quality calcium chloride ($CaCl_2$) at 100 using an alkali metal salt (MCl) at input 96. In the process, the salt is converted to acid and base by using a three compartment water splitter and a direct current input. The base product from the cell 102 usually comprises 8–18 wt % alkali MOH at 104 containing an amount of salt contaminant MCl. This solution is processed in a chromatographic separation column 106 using water elution, so as to obtain three output streams. The first output stream 108, comprising purified caustic (MOH) is optionally concentrated to ~50 wt % and sold. The second stream output at 110, rich in salt, is combined at saturator 112 with the depleted salt solution from the water splitter 102, fortified with fresh salt at input 96, purified to remove impurities such as Ca, Mg, and then returned to the salt loop at 116. The third stream at 118, comprising substantially pure water, is combined with fresh make up water at 120 and returned to the base loop of the water splitter at 122.

At 124, water is added to the acid loop, so as to obtain product acid (HCl) at 126 to provide a target concentration of ~7 wt %. Depending on the operating conditions and the membranes deployed, the acid product may contain 0.05–0.3 wt % salt content (MCl). The acid product is reacted with calcium carbonate or lime (CaO) in a neutralization tank 128, resulting in the production of ~10 wt % calcium chloride:

The calcium chloride solution is concentrated in an evaporator 130 to ~40–50% strength and sold.

Those who are skilled in the art will readily perceive various modifications which fall within the scope and spirit of the invention. Therefore, the appended claims are to be construed to include all equivalent processes.

What is claimed is:

1. A process for the a production of high purity alkali from salt, said process comprising the steps of:
   (a) processing a salt solution feedstream in an electrodialysis cell comprising bipolar membranes so as to produce an alkali solution containing a salt impurity; and
   (b) passing the solution of step (a) through a chromatographic column containing an amphoteric ion exchange resin so as to recover a purified alkali solution and a second solution containing the salt.

2. The process of claim 1 wherein the salt used is selected from a group consisting of sodium chloride, alkali metal chloride, or potassium chloride.

3. A process for a production of high purity alkali from salt, said process comprising the steps of:
   (a) processing a salt solution feedstream in an electrodialysis cell comprising bipolar membranes so as to produce an alkali solution containing a salt impurity;
   (b) passing the solution of step (a) through a chromatographic column containing an amphoteric ion exchange resin so as to recover a purified alkali solution and a solution containing the salt; and
   (c) recycling the salt solution from step (b) to join the feed stream of step (a).

4. The process of claim 3 wherein the alkali salt is selected from a group consisting of sodium chloride or potassium chloride, and a corresponding alkali produced by said process is sodium hydroxide or potassium hydroxide.

5. The process of claim 3 wherein step (b) further includes a recovery of a purified alkali solution, a solution rich in salt, and substantially water.

6. The process of claim 5 and the further steps of recycling the salt rich solution to the salt loop and returning the substantially pure water stream to the base loops of the water splitter cell.

7. The process of either of the claim 1 or claim 3 wherein the salt solution processed in step (a) is an alkali metal chloride and a corresponding acid which is produced is hydrochloric acid.

8. The process of claim 7 wherein the acid produced is neutralized with a neutralizing agent.

9. The process of claim 8 wherein the neutralizing agent is selected from a group consisting of lysine or glutamic acid and the product is a hydrochloride compound.

10. The process of claim 7 wherein the acid produced is reacted with a material selected from a group consisting of lime or calcium carbonate in order to produce calcium chloride.

11. The process of either claim 1 or claim 3 wherein the alkali solution concentration output of the electrodialysis cell is in the range of 10–18 wt %.

12. The process of either of the claim 1 or 3 wherein the purified alkali solution from the chromatographic column has a concentration 8–17 wt %.

13. A process for acidifying a brine feed in at least one chlor-alkali cell, said process comprising the steps of:
   (a) subjecting a brine stream containing alkali metal chlorate to a chromatographic separation step so as to obtain a first stream that is substantially free of the chlorate contaminant and a second stream containing chlorate;
   (b) providing a water splitter cell having bipolar membranes;
   (c) processing the first stream of step (a) in said water splitter cell to obtain an acidified brine solution;
   (d) forming a third stream by combining said second stream of step (a) with said acidified brine solution of step c, said third stream having an equivalent amount of alkali;
   (e) providing a chlor-alkali membrane electrolyzer; and
   (f) forwarding said third stream of step (d) to said electrolyzer of step (e).

14. The process of claim 13 and the further step of forming a fourth stream from said water splitter, said fourth step being a hydrochloric acid.

15. The process of claim 13 wherein the brine stream is selected from a group consisting of sodium chloride, and potassium chloride wherein the corresponding chlorate is sodium chlorate or potassium chlorate.

16. The process of either of the claim 3 or 13 wherein the electrodialysis cell is a water splitter selected from a group consisting of two compartments containing bipolar and cation exchange membranes or three compartments containing bipolar cation and anion exchange membranes.

* * * * *